(12) United States Patent
Saint-Jalmes et al.

(10) Patent No.: US 8,459,742 B2
(45) Date of Patent: Jun. 11, 2013

(54) SEATING UNIT FOR AIRCRAFT

(75) Inventors: Bruno Saint-Jalmes, Toulouse (FR);
Jason Zaneboni, Blagnac (FR);
Bernard Rumeau, Cornebarrieu (FR)

(73) Assignee: Airbus, Blagnac (FR)

( * ) Notice: Subject to any disclaimer, the term of this patent is extended or adjusted under 35 U.S.C. 154(b) by 663 days.

(21) Appl. No.: 12/192,453

(22) Filed: Aug. 15, 2008

(65) Prior Publication Data

US 2009/0050740 A1 Feb. 26, 2009

(30) Foreign Application Priority Data

Aug. 16, 2007 (FR) ...................................... 07 57078

(51) Int. Cl.
*B60N 2/06* (2006.01)
(52) U.S. Cl.
USPC .............. 297/344.24; 297/344.1; 297/188.14; 244/118.6; 244/122 R
(58) Field of Classification Search
USPC ........... 244/118.6, 122 R; 297/188.14, 344.1, 297/344.21, 344.22, 344.24; 296/65.01, 65.07, 296/65.13
See application file for complete search history.

(56) References Cited

U.S. PATENT DOCUMENTS

| | | | | |
|---|---|---|---|---|
| 2,290,464 A * | 7/1942 | Buchheit | ................... | 296/65.07 |
| 3,578,274 A | 5/1971 | Ginn et al. | | |
| 5,195,709 A * | 3/1993 | Yasushi | .................... | 248/280.11 |
| 6,332,648 B1 * | 12/2001 | Aucheron | ................ | 297/344.24 |
| 6,543,848 B1 * | 4/2003 | Suga et al. | ............... | 297/344.24 |
| 6,962,383 B2 * | 11/2005 | Takenoshita et al. | ...... | 296/65.03 |
| 7,036,883 B1 * | 5/2006 | Thompson et al. | ...... | 297/344.24 |
| 7,147,280 B2 * | 12/2006 | Duerr et al. | ............. | 297/188.01 |
| 7,422,264 B1 * | 9/2008 | Lung et al. | ................ | 296/65.01 |
| 2003/0057755 A1 * | 3/2003 | Brandt et al. | ............. | 297/344.24 |
| 2005/0077761 A1 | 4/2005 | Dryburgh et al. | | |

FOREIGN PATENT DOCUMENTS

| | | |
|---|---|---|
| DE | 10 2005 04921 A1 | 4/2007 |
| EP | 0 546 896 A1 | 6/1993 |
| EP | 0 968 916 A2 | 1/2000 |
| EP | 0 972 671 A1 | 1/2000 |
| EP | 1 870 334 A2 | 12/2007 |
| JP | 6-262971 | 9/1994 |
| JP | 2001-246967 | 9/2001 |
| JP | 2002-166760 | 6/2002 |

* cited by examiner

*Primary Examiner* — Peter Brown
(74) *Attorney, Agent, or Firm* — Oblon, Spivak, McClelland, Maier & Neustadt, L.L.P.

(57) ABSTRACT

A seating unit for an aircraft including at least one seat and a pivoting device for pivoting the seat around a vertical axis, wherein each seat includes: a plate on which the seat is pivotably assembled; a platform configured to fasten onto rails for accommodating the seat; a translatory movement device for a translatory movement of the plate in relation to the platform along a horizontal direction; and an immobilization device for immobilizing the plate relative to the platform in the translatory movement of the plate, and immobilizing the seat in relation to the plate in a rotary movement of the seat.

24 Claims, 4 Drawing Sheets

SEATING UNIT FOR AIRCRAFT

BACKGROUND OF THE INVENTION

I. Field of the Invention

This patent application relates to a seating unit for aircraft, and in particular for an aircraft cabin.

The field of this invention is the transport of passengers aboard an aircraft. The invention relates in particular to aircraft intended to be operated commercially by airline companies for the transport of a large number of passengers. Such aircraft comprise a cabin in which seats able to accommodate passengers during a trip are arranged. These seats are intended to accommodate passengers comfortably and also to ensure the safety of the latter. In air transportation, three main comfort levels are offered to the passengers: economy class, business class and first class. The comfort of the passenger is greater or lesser, depending on the class selected. Whatever the comfort level selected, there generally are seats, possibly convertible into berths, these seats being fastened onto the floor of the aircraft cabin. More often than not, all the seats in the cabin face the front of the aircraft, so that all the passengers are traveling in the direction of movement of the aircraft.

The technical problem on which this invention is based is to be able to adjust the interior space of an aircraft cabin, in particular after delivery of the aircraft, or also even in flight.

II. Description of Related Art

Patent application FR-2 863 558 proposes a seat with a movable back making it possible to implement in an aircraft cabin zones in which the passengers may travel facing each other. Such a solution is intended for the most part to be applied to seats used in economy class.

As for the document EP-1 211 176, it proposes a solution seeking to optimize the space for each passenger in an aircraft cabin equipped with seats convertible into berths. The proposed solution provides for having the seats pivot when they change over from their position intended to accommodate a passenger in seated position to their position intended to accommodate this passenger in lying-down position. A pivoting on the order of 40 degrees is contemplated here. This solution, however, does not make it possible to adjust the interior space of the cabin in order to change relative positions between seats.

Finally, EP-968 916 proposes an aircraft seat comprising an assembly structure (stator) for the assembly of the seat on conventional rails for accommodating seats of an aircraft, and a frame (rotor) assembled rotating on the said structure and making it possible to have the seat pivot around a vertical axis and to lock the seat in four crash positions offset by 90°. The assembly structure of the seat is assembled fastened onto two rails of the aircraft. For this purpose, it has four fastening components placed at the four corners of the structure and two intermediate immobilization shafts. Each fastening component has a foot that can slide in the rail in order to make it possible to adjust the positioning of the assembly structure—and therefore of the seat—relative to the rails. Once positioned, the assembly structure is fastened permanently to the rails with the aid of the immobilization shafts, each shaft being inserted into a circular opening of a rail. From that moment on, the seat no longer has any degree of freedom in longitudinal translation with regard to the rails.

The solution proposed by EP-968 916 therefore makes it possible to choose the number of seats to be laid out in the cabin of the aircraft and to position each seat in the desired place in the cabin. But once the cabin is so configured, only the orientation of each seat (which is assembled pivoting) can be changed easily. It especially is not provided to be able to change the position and in particular the offset of the seats among themselves. Such a change is not conceivable in practice, because it involves completely dismantling the seats in question and consequently requires many hours of labor. In addition, it can be done only on the ground and entails an immobilization of the aircraft.

BRIEF SUMMARY OF THE INVENTION

As mentioned above, the purpose of this invention is to offer, most particularly for an aircraft cabin, the possibility of choosing among multiple configurations and of changing the chosen configuration in simple manner after delivery of the aircraft, without this change making it necessary to dismantle the seats. Preferably, the changeover from one configuration to another should be able to be accomplished rapidly and easily, and be able to be contemplated in flight.

To this end, this invention proposes a seating unit for aircraft, and in particular for an aircraft cabin, comprising at least one seat and means making the said seat pivoting around a more or less vertical axis.

According to this invention, this seating unit comprises:
an individual plate for each seat, on which the said seat is assembled pivoting,
a platform suitable for being able to be fastened onto conventional rails for accommodating of aircraft seats,
means for guiding each individual plate in translation in relation to the platform along a more or less horizontal direction,
immobilization means making it possible to immobilize, on the one hand each individual plate relative to the platform in its translatory movement, and on the other hand each seat relative to its individual plate in its rotary movement.

It is recalled that a conventional rail for accommodating seats of an aircraft comprises, in known manner, anchoring points (for fastening of the seats), evenly spaced, usually every inch (or every 2.54 cm), along the rail. The rail generally comprises a U-shaped profile consisting of a core and two flanges, which flanges are prolonged by flange returns extending parallel to the core toward the inside of the rail and in which circular openings forming the aforementioned anchoring points are cut out. Such a rail is illustrated in EP-968 916.

By virtue of the invention, each seat of an aircraft cabin equipped with seating units according to the invention may be moved in translation and in rotation in the cabin, independently of the other seats present therein. That being the case, numerous seat configurations may be considered, and the said cabin then may be adjusted on request depending on the wishes of the passengers and/or on various constraints. In order to change the configuration, all one needs to do is manipulate the immobilization means so as to unlock the seat in question and its individual plate, then move the said seat, the platform of the seating unit remaining fastened to the rails of the aircraft.

It is to be noted that the person skilled in the trade was put off by the solution proposed by the invention because at first glance it results in an introduction of mass by reason of the combination, for each seating unit, of a platform and one or more individual plates. But the inventors determined that in the end this introduction of mass was entirely acceptable, both quantitatively and as regards the predominant advantages obtained through this combination, in terms not only of adjustability of the cabin but also of ease of manufacture and assembly.

According to a preferred embodiment, making it possible to optimize the movement of each seat, means provide for the coupling of the translatory movement of the seat with the rotary movement thereof in such a way that a translation of the seat brings about a rotation thereof and/or vice versa. It then is unnecessary first to translate the seat, then to have it pivot; the seat can be translated and pivoted with a single action. It thus is possible in a single movement to have each seat change over from a first position with a first orientation to a second position with a second orientation.

In order to couple the pivoting movement with the translatory movement, for each seat, the means making it possible to have the seat to pivot comprise, for example, a rack parallel to the direction of translatory movement of the seat as well as at least one cogwheel meshing with the said rack so as to drive the seat in rotation. In this embodiment, it may be provided that at least one first cogwheel meshes with the rack, and that a second cogwheel of greater diameter than the first is centered on the vertical axis of rotation of the seat and meshes with the said first wheel.

In standard manner, each seat comprises, for example, a sitting surface, a back and armrests. To facilitate pivoting, the whole formed by these components of the seat has, in a view from above, a more or less circular contour.

Advantageously, the seating unit according to the invention further comprises, for each seat, a storage unit arranged next to the seat and extended in the direction of translatory movement of the seat. This storage unit is provided, in particular, to enhance the comfort of the passenger. According to an advantageous embodiment of the invention, each storage unit moves in translation with the individual plate of the corresponding seat. To this end, the storage unit is, for example, assembled fastened onto the said individual plate. Preferably, each storage unit incorporates two retractable shelves, and one of the said shelves is hinged so as to be able to be opened out on one side of the storage unit while the other shelf is hinged so as to be able to be opened out on the other side of the storage unit. The individual occupying a seat according to the invention then may, when the seat pivots approximately 180°, use one of the shelves in one pivoted position of the seat and the other shelf in the other pivoted position of the seat.

Advantageously, a seating unit according to the invention comprises four seats, the four seats moving in translation along parallel directions. Preferably, the four seats are arranged more or less in a square, each seat is equipped with a storage unit, and each storage unit is placed between two seats of the seating unit.

Advantageously, guiding grooves are implemented in the platform for the translatory guidance of each individual plate. Moreover, threaded bores preferably are provided in the platform in order to allow immobilization in a predefined position, with the aid of at least one fastening device, of each individual plate.

This invention also relates on the one hand to an aircraft cabin, characterized, in that it comprises at least one seating unit such as described above, and on the other hand to an aircraft, characterized in that it comprises such a cabin.

BRIEF DESCRIPTION OF THE DRAWINGS

Details and advantages of this invention will emerge more clearly from the description that follows, presented with reference to the attached schematic drawings on which.

DETAILED DESCRIPTION OF THE INVENTION

Figure 1:
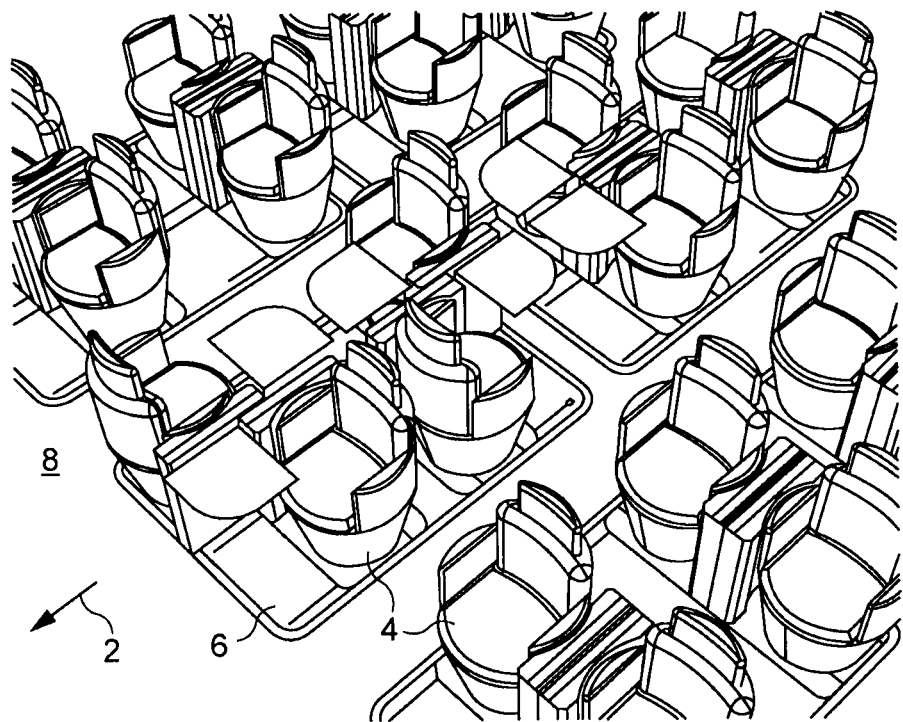
FIG. 1 depicts in perspective a partial view of a cabin equipped with seating units according to the invention.
Figure 2:
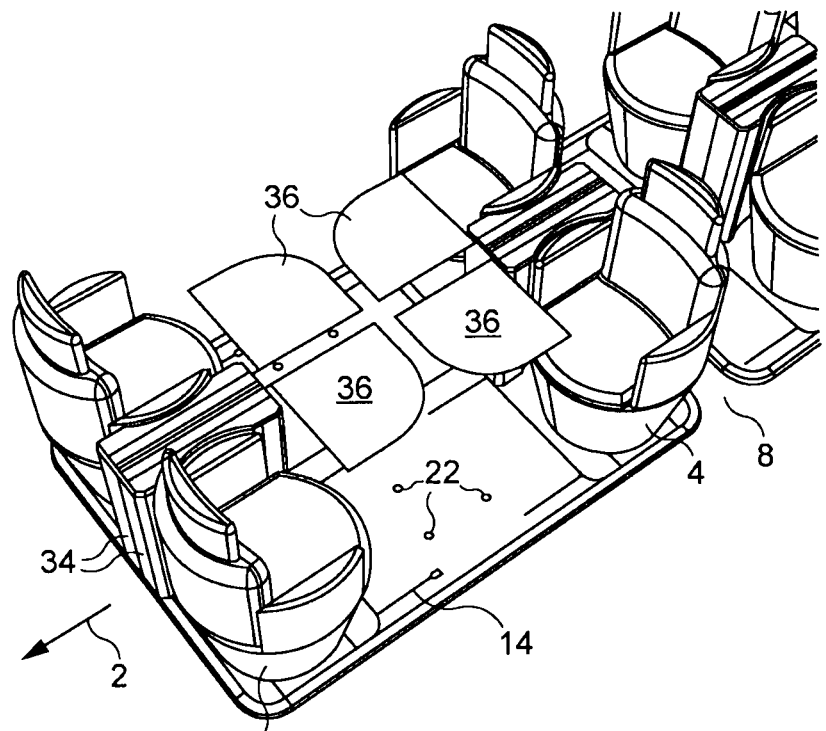
FIG. 2 depicts in perspective a seating unit according to the invention comprising four seats.
Figure 3:
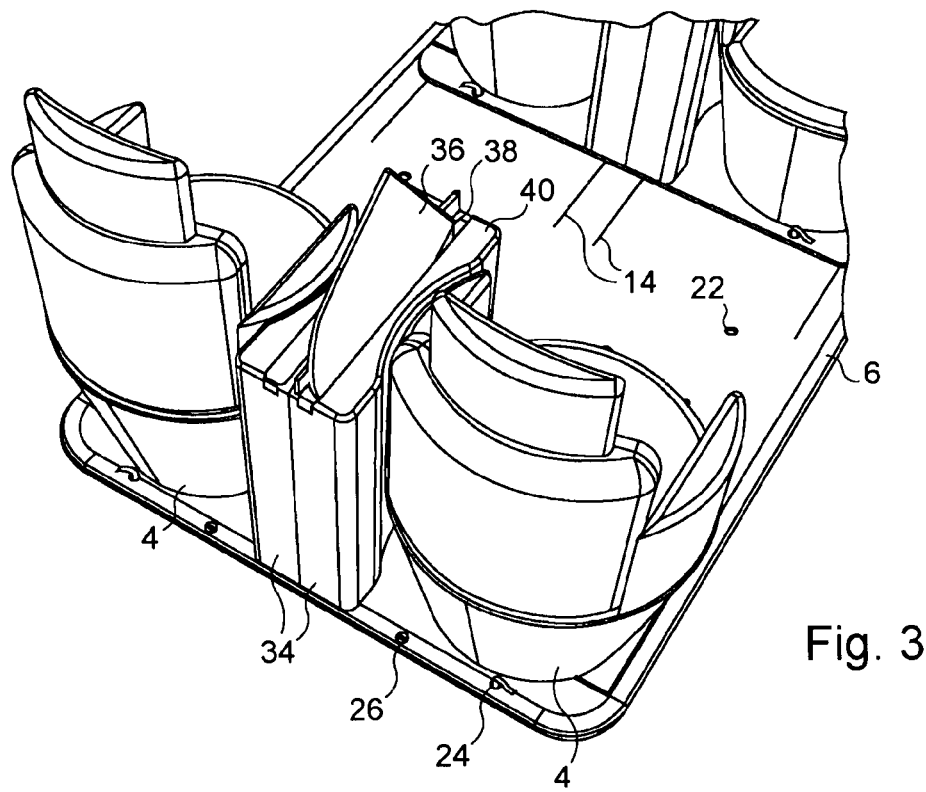
FIG. 3 shows in perspective, on a larger scale, two seats of a seating unit according to the invention.
Figure 4:
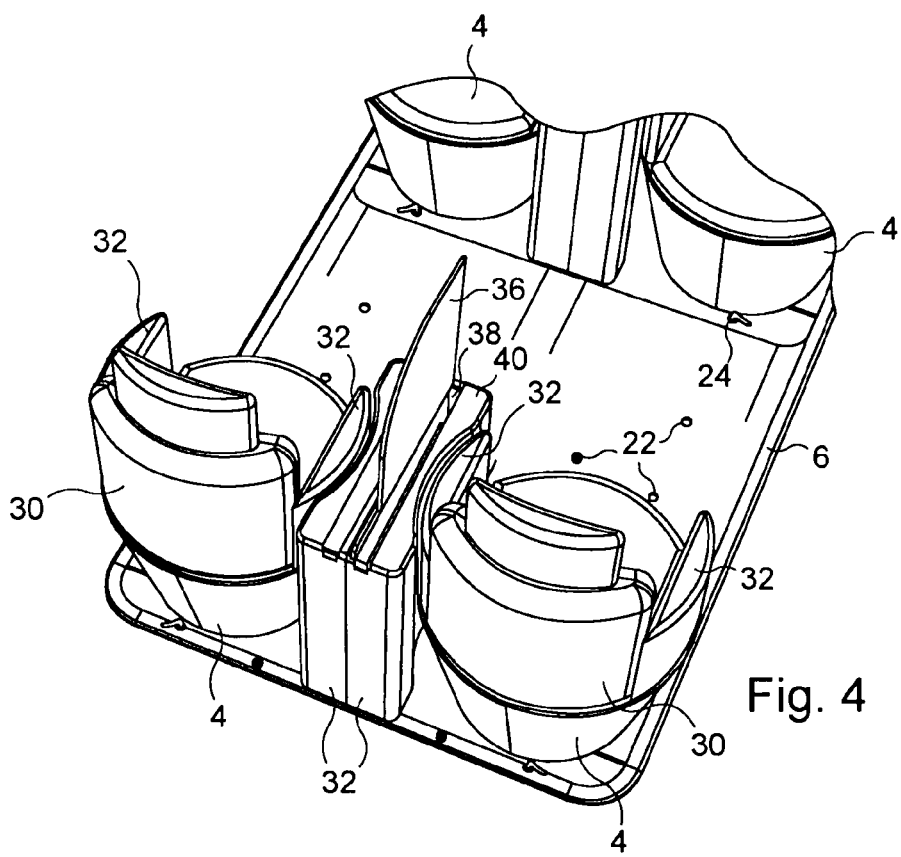
FIG. 4 is a view corresponding to FIG. 3 with a separating partition placed between the two seats.

FIGS. 1 and 2 illustrate different configurations that may be obtained in an aircraft cabin intended for the transport of passengers and equipped with seating units according to the invention. On these Figures, an arrow 2 indicates the course and direction of movement of the aircraft. In the cabin, seating units each comprising several seats 4 are installed to accommodate passengers. In the embodiment depicted, each of the seats 4 can accommodate a passenger so that the latter is traveling looking in the direction of movement of the aircraft (referred to as direction of travel)) symbolized by the arrow 2 or in the opposite direction. On FIGS. 1 and 2, there are seen each time two seats with the back oriented in the direction opposite to travel.

It is seen that different configurations may be contemplated. In the preferred embodiment depicted on the drawings, each seating unit comprises four seats supported by a platform 6, itself fastened onto conventional rails for accommodating seats (not depicted) extending over a floor 8 of the aircraft cabin. Each platform 6 is more or less rectangular and the 4 seats are arranged in a "square on the platform 6, that is to say, at the four corners of the platform 6.

Each seat 4 of a seating unit according to the invention possesses a dual movement: first of all a translatory movement and then a rotary movement. In the scenario depicted on the drawings, the translatory movement is parallel to the direction of movement of the aircraft depicted by the arrow 2. As for the rotary movement, it is a movement around a vertical axis perpendicular to the floor 8, assumed to be horizontal, of the cabin of the aircraft. The seat 4 then can effect a rotation advantageously greater than 90°, and preferably of 180°.

In the preferred embodiment depicted on FIGS. 1 and 2, each seat 4 can occupy two main positions. First of all, each seat 4 can have, in relation to the direction of movement of the aircraft, a moved-back position in which it is oriented in the direction of travel. Each seat 4 also can have a moved-forward position in relation to the direction of movement of the aircraft, and in which it is oriented in the direction opposite to travel. Two main positions of the seat 4 then are involved in the preferred embodiment described here. Of course, in order to change over from one position to the other, the seat assumes intermediate positions (not depicted on the drawings).

Figure 6:
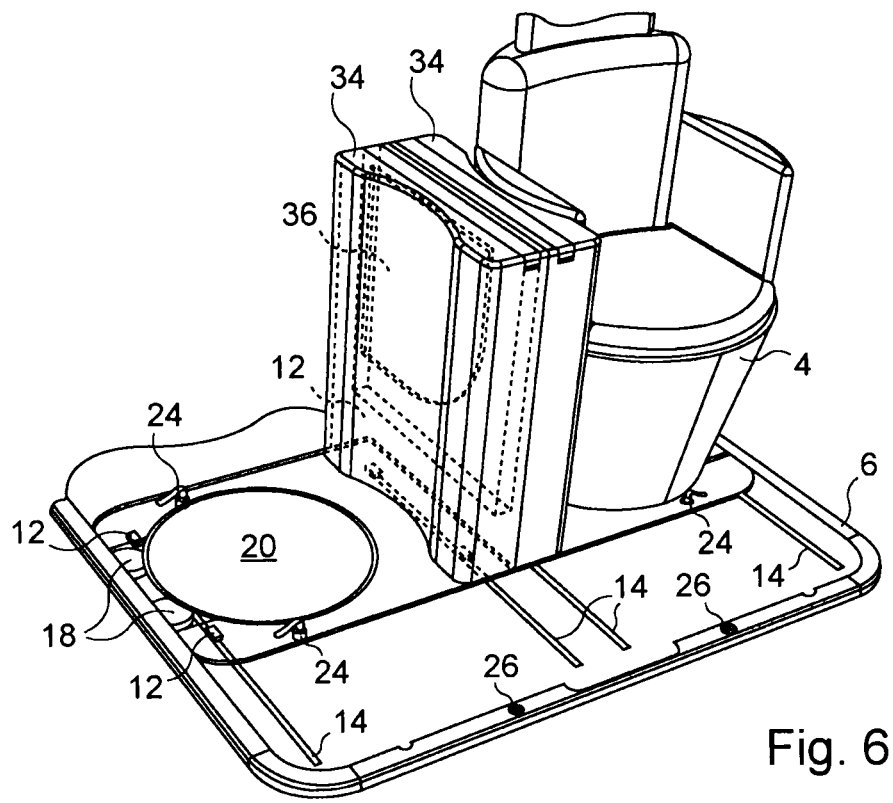
FIG. 6 is a perspective view schematically showing a seat and the mechanism associated with such a seat.
Figure 7:
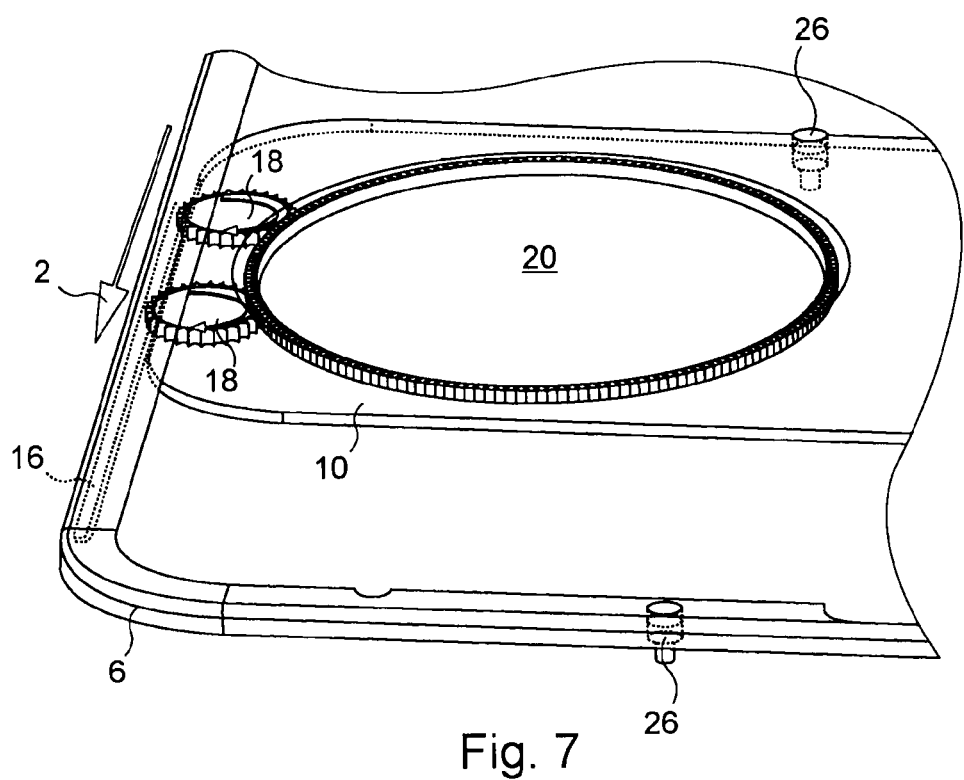
FIG. 7 is a perspective view from above of the mechanism for driving a seat of the seating unit according to the invention in rotation.
Figure 8:
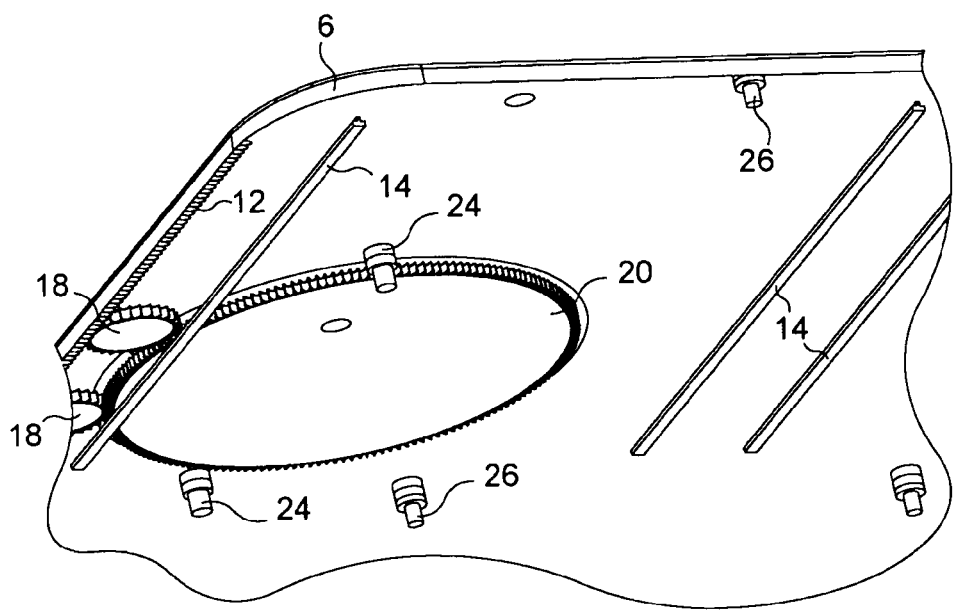
FIG. 8 shows a view of the mechanism of FIG. 7 from below.

In order to facilitate the moving of the seats, the translatory movement and the rotary movement are linked. The mechanism associated with each seat is depicted in detail on FIGS. 6 to 8.

An individual plate 10 assembled sliding in translation on the platform 6 of the corresponding seating unit is associated with each seat 4. As for the seat 4, it is assembled pivoting around a vertical axis in relation to the individual plate 10.

The guiding of each individual plate 10 is ensured by four runners 12 each sliding in a groove 14 implemented in the corresponding platform 6. Two grooves 14 correspond to each seat 4 (or individual plate 10), each of these grooves 14 accommodating two runners 12. Here the grooves 14 are longitudinal grooves parallel to the direction of movement of the aircraft.

At a level intermediate between a groove 14 and the individual plate 10, the platform 6 supports a rack 16, itself also oriented longitudinally. As may be seen in particular on FIGS. 7 and 8, two small cogwheels 18 each mesh on the one hand with the rack 16 and on the other hand with a large cogwheel 20. The latter is integral with the seat 4. It thus is evident to the person skilled in the trade that when the individual plate 10 is moved in translation, being guided in the grooves 14, the seat 4 possesses the same translatory movement combined with a rotary movement around the vertical axis corresponding to the axis of the large cogwheel 20. The dimensions of the small cogwheels 18 and of the large cogwheel 20 are chosen so that when the individual plate 10 effects its movement, the seat 4 effects a rotation of 180°. The movement of the individual plate 10 is defined by the length of the grooves 14 and the position of the corresponding runners 12. This movement preferably corresponds more or less to the length of the space set aside for a passenger decreased by the length of his seat. Thus, in the two main positions of the seat, the latter is more or less at the end of the space set aside for the corresponding passenger.

Means for immobilization make it possible to keep each seat 4 firmly in its two main positions, when it is facing the direction of movement of the aircraft or opposite to the direction of movement of the aircraft. In the embodiment depicted on the drawing, three anchoring points 22 are provided for each seat 4 in the platform 6 of the corresponding seating unit for each of the two main positions of the seat. In the embodiment depicted on the drawings, it is provided to use quarter-turn fastening devices to lock the individual plate 10 in each of these positions. By immobilizing the individual plate 10 in translation in this way, the seat 4 also is immobilized in rotation. For considerations of ease of use, two first fastening devices are fastening devices 24 controlled by a handle. For reasons of safety, however, so that the fastening devices are not all loosened inadvertently during a trip, a third fastening device 26 requiring the use of a tool also is provided. Here it may involve a fastening device such as those commonly used previously to fasten seats directly in conventional rails for accommodating seats of an aircraft (their providing regularly spaced anchoring points for this purpose). These fastening devices, known to the person skilled in the trade, are not described in further detail here. These same fastening devices 26 may be used for the fastening of the platform 6 of each seating unit according to the invention in the conventional rails for accommodating seats of the aircraft.

In a variant embodiment, two intermediate anchoring points (not depicted but similar to anchoring points 22) may be provided to lock each seat of a seating unit in an intermediate position. An advantageous embodiment here provides that provision is made for intermediate anchoring points to lock the seat when it is oriented more or less toward the center of the platform 6 (corresponding to the center of the seating unit). This corresponds, for example, to a rotation of approximately 45° in relation to one of the main positions of the seat. Thus, by locking the four seats (or else only two or three) in such an intermediate position, the passengers occupying these seats are seated more or less in a circle. A round (or other shape) table then can be placed among the passengers and serve as a conference table, game table, etc.

Figure 5:
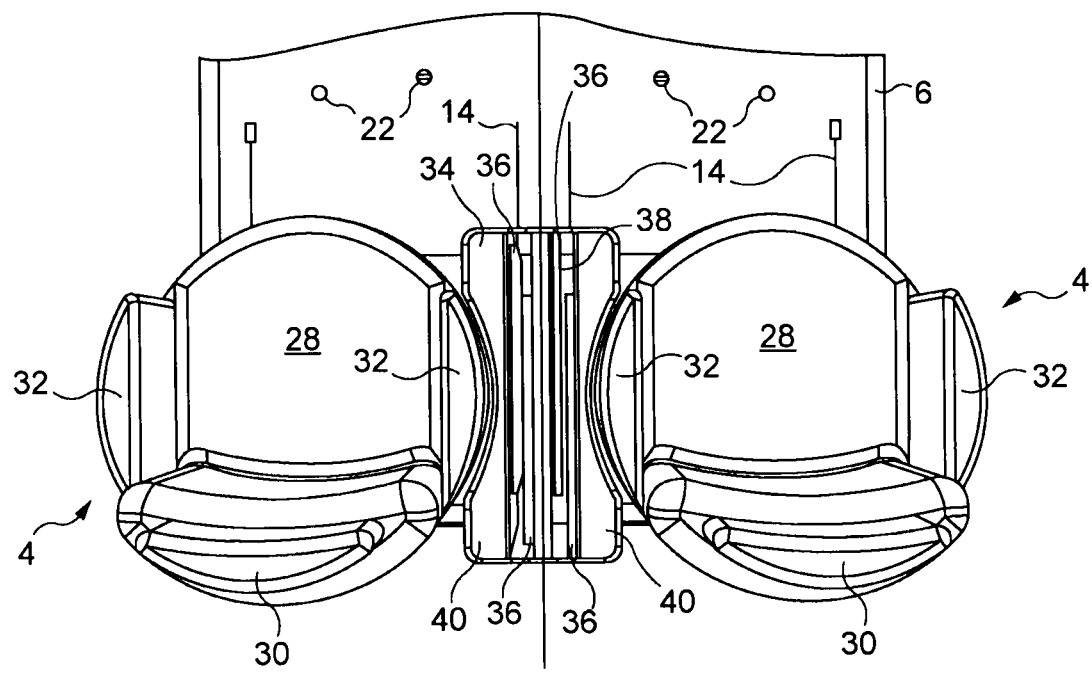
FIG. 5 is a view from above of the two seats of FIGS. 3 and 4.

In standard manner, each seat 4 of the seating unit according to the invention preferably comprises a sitting surface 28, a back 30 and two armrests 32. In a view from above (FIG. 5), these components preferably impart a circular peripheral contour form to the seats 4.

On the preferred embodiment depicted on FIGS. 1 to 6, each seat 4 is associated with a storage unit 34. Each storage unit 34 is arranged next to the seat 4 with which it is associated. It is supported by the individual plate 10 of the said seat, moves in translation therewith, but does not pivot. This storage unit 34 thus is to the left of the passenger in one of the main positions of the seat 4 and to his right in the other of the main positions of the same seat. Moreover, it remains continuously placed next to the seat during the movements of the latter. As is seen on the Figures, each storage unit 34 thus is placed each time next to the corresponding seat 4, between this seat 4 and a neighboring seat 4 supported by the same platform 6. It follows therefrom that the storage units 34 do not hinder access to the seats. In addition, in the case of a storage unit such as illustrated comprising a rectangular platform 6 and four seats, the storage units 34 thus are located in a central zone of the seating unit. These storage units 34 can be used by the passengers for depositing some personal effects during the flight as well as for holding items that may be used, for example, to enhance the comfort of the passengers (pillows, . . . ).

Each storage unit 34 preferably accommodates two shelves 36. As can be seen in particular on FIGS. 1 and 2, a first shelf 36 is used when the corresponding seat 4 is oriented in the direction of movement of the aircraft. This first shelf 36 then emerges through an opening 38 implemented on the upper face 40 of the storage unit 34 and is hinged so as to open out toward the front of the storage unit 34 (relative to the direction of movement of the aircraft). As for the second shelf 36, it likewise emerges through the opening 38 of the storage unit 34, but is hinged so as to open out toward the rear of the storage unit 34 (relative to the direction of movement of the aircraft). This second shelf 36 then is used when the seat 4 is oriented in the direction opposite to the movement of the aircraft.

In the two main positions of the seat 4, the passenger thus can use one shelf 36. As for the other shelf 36, it may be used as a separating partition between two seats in order to ensure a private space and a certain confidentiality for the passenger occupying the corresponding seat 4.

The embodiment of the invention described above makes it possible to have an easily adjustable aircraft cabin. Each seat may be pivoted independently of the other seats. The rotating seats make it possible to set up areas for discussion, leisure, work, . . . for the greater comfort of the passengers. Groups, families or couples can be face to face (FIGS. 1 and 2). It is to be noted that it is possible to create configurations involving several seating units. Thus, when two seats are arranged face to face, these two seats may belong to the same seating unit or to two separate seating units.

The preferred embodiment described above provides for four seats per seating unit. The invention also relates, however, to a seating unit comprising two, three, five, six . . . seats or more. Regardless of the number of seats, the latter may be arranged so as to form one or more rows in a longitudinal direction (direction of movement of the aircraft), and one or more rows in a transverse direction. It then is possible to adapt the number of seats abreast in a cabin to the width of the said cabin. For example, there may be provided in particular seating units comprising two seats aligned along the longitudinal direction (or only one seat abreast), intended to be arranged along a wall of the aircraft, on the window side thereof.

It also is possible, in this invention, to propose seating units comprising a single seat and a single individual plate. In this case, the person skilled in the trade might have been tempted to assemble the said individual plate directly on the rails of an aircraft cabin (or even on the floor of the latter) and so that the plate slides on the said rails. Despite a corresponding introduction of mass, the invention provides on the contrary for equipping such a single-seating unit with an intermediate platform, fastened to the said rails and on which the individual plate is assembled sliding. The use of such a platform makes it possible to assemble in the factory, on the production site for the seating units, the seat and all the means making it pivoting and sliding (the assembly, between the plate and the platform, of the rack and cogwheel mechanism described above, thus is mass produced in the factory). The possible subsequent adjustments and checks also are accomplished in the factory, outside the aircraft. Then all that remains is to fasten the seating unit, by way of its platform, onto the rails of an aircraft, this operation being simple and rapid. The platform thus allows significant savings in terms of labor time and costs. This advantage is even more important in the case of seating units comprising several seats. The platform then makes it possible to assemble several seats in the aircraft in a single operation.

This invention is not limited to the preferred embodiment depicted on the drawings and described above by way of non-limitative example, or to the variants mentioned. It also relates to all the variant embodiments within the capacity of the person skilled in the trade in the context of the claims below.

Thus, for example, other mechanisms could be provided in order to ensure the movement of a seat of a seating unit according to the invention. Such a seat should be able to move in translation, by means of its individual plate, and in rotation, but these two movements are not necessarily linked. It could be provided, for example, first to translate the individual plate and therefore the seat, then to have the seat pivot, or vice versa. These movements, for example, could be motorized: one motor, for example, might drive the individual plate (and the seat) in translation and another motor might be used to implement the rotation of the seat.

The preferred embodiment described provides for a rotation of 180° for each seat of the seating unit. In particular in the case of an independent drive for rotation and for translation, it is possible to use the rotary drive means for the seat to change the orientation of the latter without moving it in translation. This embodiment makes it possible to offer even more adjustability to the invention. A passenger then may orient his seat as he chooses during the trip. As a variant, it is possible to provide, for example, a system functioning in a manner similar to the system described (linked movements) but with a possibility of release between the movements. In the system described, a degree of freedom in rotation also may be provided between the seat and the large cogwheel. Other variants also may be considered.

Since each seat of a seating unit according to the invention is intended to be pivoted, it preferably has, in a view from above, a form with a more or less circular outer contour. This form, which also has the advantage of being esthetically pleasing, is optional, of course. An overall square or rectangular or any other form of contour also may be considered.

The above description provides only for a movement of the seat in longitudinal translation. A movement along another direction also may be considered.

The invention claimed is:

1. A seating unit for an aircraft, comprising:
   at least two seats,
   wherein the seating unit comprises a platform for accommodating the at least two seats, the platform is configured to be mounted on at least one rail in a floor of the aircraft,
   wherein each seat is pivotably mounted to an individual corresponding plate for rotary movement about a vertical axis of rotation, via a pivoting means, and each plate is mounted to the platform via a translatory movement means, disposed between the plate and the platform, for a translatory movement of the plate in relation to the platform along a substantially horizontal direction,
   wherein the seating unit comprises immobilization means, disposed on the plates and the platform, for immobilizing each plate relative to the platform and for immobilizing each seat relative to its corresponding plate, and
   wherein the pivoting means pivots each seat more than 90° when the seat is moved along the substantially horizontal direction.

2. The seating unit according to claim 1, wherein each seat further comprises:
   a coupling means associated with the platform and the seat for coupling of a translatory movement of the seat with the rotary movement of the seat,
   wherein the translatory movement of the seat brings about a rotation of the seat or the rotation of the seat brings about a translatory movement of the seat.

3. The seating unit according to claim 1, wherein the pivoting means comprises:
   a rack disposed on the platform parallel to a direction of said translatory movement of the seat, and
   at least one cogwheel associated with the seat meshing with the rack to rotate the seat.

4. The seating unit according to claim 3, wherein
   a first cogwheel meshes with the rack, and
   a second cogwheel of greater diameter than the first cogwheel is centered on the vertical axis of rotation of the seat and meshes with the first cogwheel.

5. The seating unit according to claim 1, wherein each seat further comprises:
   a sitting surface, a back, and armrests, wherein
   the sitting surface, the back, and the armrests form, in a view from above, a substantially circular contour.

6. The seating unit according to claim 1, wherein each seat further comprises a storage unit arranged next to the seat and extended in a direction of translatory movement of the seat.

7. The seating unit according to claim 6, wherein the storage unit translates with the plate of a corresponding seat.

8. The seating unit according to claim 6, wherein
   the storage unit incorporates two retractable shelves,
   one of the shelves is hinged to open out on a side of the storage unit, and
   an other shelf of the retractable shelves is hinged to open out on an other side of the storage unit.

9. The seating unit according to claim 1, comprising four seats configured to translate parallel to each other.

10. The seating unit according to claim 9, wherein
    the four seats are arranged substantially in a square,
    each seat is equipped with a storage unit, and
    each storage unit is placed between two seats of the seating unit.

11. The seating unit according to claim 9, wherein the four seats are rotatable so as to face each other.

12. The seating unit according to claim 9, wherein one of the four seats is rotatable independently of the three remaining seats.

13. The seating unit according to claim 1, wherein the translatory movement means includes guiding grooves in the platform that allow the translatory movement of the plate.

14. The seating unit according to claim 1, wherein the immobilization means includes threaded bores in the platform to allow an immobilization of the plate in a predefined position with an aid of at least one fastening device.

15. An aircraft cabin, comprising at least one seating unit according to claim 1.

16. An aircraft, comprising the cabin according to claim 14.

17. The seating unit according to claim 1, wherein one end of the translatory movement is configured to face a direction of travel of the aircraft and an other end of the translatory movement faces a direction opposite to the direction of travel.

18. The seating unit according to claim 1, wherein the pivoting means pivots the seat 180° between one end of the translatory movement to an other end of the translatory movement.

19. The seating unit according to claim 1, wherein the seat is configured to be locked in an intermediate position, in which the seat is rotated approximately 45° in relation to the main position of the seat.

20. The seating unit according to claim 1, wherein the pivoting means comprises:
a rack disposed on the platform parallel to a direction of said translatory movement of the seat, and
two first cogwheels associated with the seat meshing with the rack to rotate the seat.

21. The seating unit according to claim 20, wherein the two first cogwheels also mesh with a second cogwheel of greater diameter than the two first cogwheels, and the second cogwheel is centered on the vertical axis of rotation of the seat.

22. The seating unit according to claim 1, wherein each seat further comprises a storage unit mounted to the plate in a fixed position and arranged next to the seat.

23. A seating unit for an aircraft, comprising:
at least two seats,
wherein the seating unit comprises a platform for accommodating the seats,
wherein each seat is pivotably mounted to an individual corresponding plate about a vertical axis of rotation, via a pivoting means, and each plate is mounted to the platform via a translatory movement means, disposed between the plate and the platform, for a translatory movement of the plate in relation to the platform along a substantially horizontal direction,
wherein the seating unit comprises immobilization means, disposed on the plates and the platform, for immobilizing each plate relative to the platform and for immobilizing each seat relative to its corresponding plate, and
wherein each seat further comprises a storage unit arranged next to the seat and extended in a direction of translatory movement of the seat,
the storage unit incorporates two retractable shelves,
one of the shelves is hinged to open out on a side of the storage unit, and
an other shelf of the retractable shelves is hinged to open out on an other side of the storage unit.

24. A seating unit for an aircraft, comprising:
at least two seats,
wherein the seating unit comprises a platform accommodating the at least two seats,
the platform is configured to be mounted on at least one rail in a floor of the aircraft,
wherein each seat is pivotably mounted to an individual corresponding plate for rotary movement about a vertical axis of rotation, via a pivoting means, and each plate is mounted to the platform via a translatory movement means, disposed between the plate and the platform, for a translatory movement of the plate in relation to the platform along a substantially horizontal direction,
wherein the seating unit comprises immobilization means, disposed on the plates and the platform, for immobilizing each plate relative to the platform and for immobilizing each seat relative to its corresponding plate, and
a coupling means associated with the platform and the seat for coupling of a translatory movement of the seat with the rotary movement of the seat, wherein
the translatory movement of the seat brings about a rotation of the seat or the rotation of the seat brings about a translatory movement of the seat, and
the pivoting means pivots the seat more than 90° when the seat is moved along the substantially horizontal direction.

\* \* \* \* \*